US005173192A

United States Patent [19]
Shalev

[11] Patent Number: 5,173,192
[45] Date of Patent: Dec. 22, 1992

[54] METHOD AND APPARATUS FOR FILTERING WATER

[76] Inventor: Amnon Shalev, 21900 Marlee St. #244, Woodland Hills, Calif. 91367

[21] Appl. No.: 821,462

[22] Filed: Jan. 15, 1992

Related U.S. Application Data

[63] Continuation-in-part of Ser. No. 769,876, Oct. 1, 1991.

[51] Int. Cl.⁵ .................. B01D 37/00; B01D 24/00
[52] U.S. Cl. ........................... 210/767; 210/807; 210/244; 210/282; 210/473; 210/474
[58] Field of Search ............... 210/767, 282, 244, 474, 210/464, 466, 473, 472, 477, 663, 807; 222/189, 129.1

[56] References Cited

U.S. PATENT DOCUMENTS

| | | | |
|---|---|---|---|
| 466,809 | 1/1892 | Stone | 210/244 |
| 1,629,269 | 5/1927 | Hagg | 210/282 |
| 2,167,225 | 7/1939 | Van Eweyk | 210/473 |
| 2,502,298 | 3/1950 | White | 210/474 |
| 4,936,984 | 6/1990 | Blandford et al. | 210/472 |
| 4,995,975 | 2/1991 | Jacquot et al. | 210/282 |

Primary Examiner—Robert A. Dawson
Assistant Examiner—Ana M. Fortuna
Attorney, Agent, or Firm—Freilich, Hornbaker, Rosen

[57] ABSTRACT

A tap water filter (130), filter apparatus (150) and methods of use thereof are disclosed. The filter may be disposed between a one liter plastic beverage container (120) filled with tap water and an empty beverage container (122) to filter the tap water through filter media (164) into the previously empty container. The apparatus defines spouts (132, 134) that retain the containers in place. The filter also defines a buffer (140) that automatically prevents water overflow. The filter apparatus includes the filter and a storage container (152) which receives the filter and is supported, in turn, on a stand (154). Tap water may be filtered into the storage container and dispensed therefrom via a faucet (157) mounted in the container wall (158).

7 Claims, 5 Drawing Sheets

METHOD AND APPARATUS FOR FILTERING WATER

CROSS REFERENCE TO RELATED APPLICATIONS

This application is a continuation-in-part of application Ser. No. 07/769,876 filed Oct. 1, 1991, the disclosure of which is hereby incorporated by reference.

FIELD OF THE INVENTION

The present invention pertains generally to a method and apparatus for filtering water, and more particularly, to portable apparatus adapted for low flow rate filtering.

BACKGROUND OF THE INVENTION

It has become increasingly popular to purchase bottled spring water, mineral water and other purified waters as a replacement for tap water which may contain undesirable chemicals and other contaminants. Such waters are supplied in beverage containers varying in size, typically, from 350 milliliters to 2 liters but which may be as large as 5 gallons.

Additionally, a variety of tap water filtering devices are widely commerically available for permanent or semipermanent installation in the home and office. Such devices are variously intended to service an entire household, a sink, a faucet and a refrigerator ice maker water supply line.

Many of these devices utilize granular activated carbon filters to remove organic chemicals (e.g. chlorine, hydrogen sulphide, pesticides, herbicides, phenol, chlorophenol and hydrocarbons) from water. An additional filter may be directed to the removal of sediments such as rust and other particles.

SUMMARY OF THE INVENTION

The present invention is directed to methods and apparatus for enabling an individual user to utilize readily available beverage containers to prepare and dispense filtered tap water and thus eliminate the user's need to purchase bottled water and/or install permanent or semipermanent filter devices.

In accordance with the invention, a filter unit is provided comprised of a hollow enclosure defining a filter media cavity, and water entrance and exit apertures communicating with said cavity.

In a preferred embodiment, the entrance aperture comprises a hollow tube or spout projecting axially from an end wall of the enclosure. A peripheral wall extending axially from the enclosure surrounds and is radially spaced from the entrance spout to define a toroidal volume therebetween. The entrance spout is dimensioned to cooperate with the mouth of a standard beverage container (e.g. 1–2 liters), so as to receive water therefrom and structurally support the container in an inverted vertical orientation. Waterflow from the container flows through the hollow entrance spout into the filter media cavity, and also may flow into the toroidal volume which functions as a temporary water storage buffer. The floor of the toroidal volume is slotted to permit flow from the buffer into the filter media cavity.

In accordance with an important feature of the invention, the filter unit is configured for removable mounting in an opening of a storage container. In a preferred embodiment, the filter enclosure includes an external lip configured to rest on the rim of the storage container opening.

In accordance with another aspect of the invention, the storage container preferably includes a selectably operable water dispensing faucet.

In accordance with another aspect of the preferred embodiment, the filter enclosure exit spout is preferably configured to be received in the mouth of a range of standard beverage containers (e.g. 1–5 liters).

The novel features of the invention are set forth with particularity in the appended claims. The invention will be best understood from the following description when read in conjunction with the accompanying drawings.

DETAILED DESCRIPTION

Figure 1:
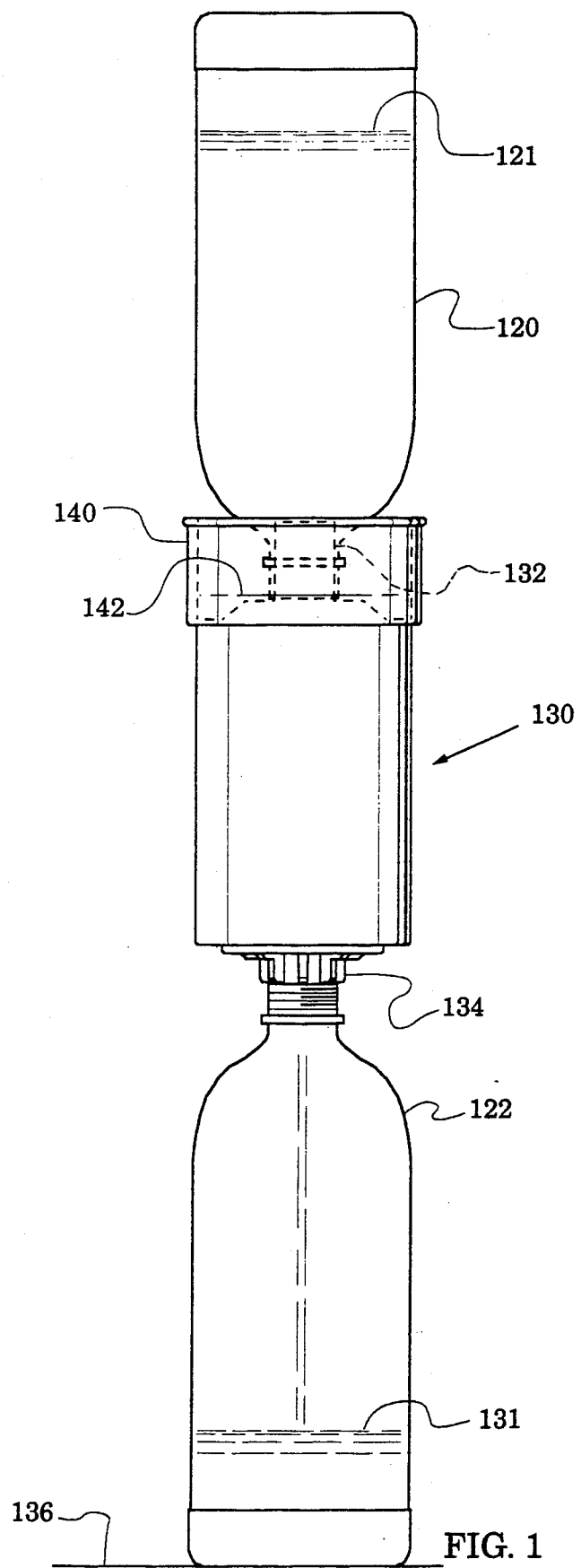
FIG. 1 is an elevation view of a preferred filter embodiment, in accordance with the present invention, disposed between two one liter beverage containers for receiving tap water from one of the containers and discharging filtered water into the other of the containers.

Plastic beverage containers, such as the containers 120, 122 shown in FIG. 1, are used in great numbers in the sale of beverages (e.g. spring water, mineral water, colas and fruit juices) and are readily available in the home and workplace. These containers typically vary in size from 350 milliliters to 2 liters with opening inner diameters in the range of $\frac{3}{4}$ of an inch to one inch (other beverage containers vary up to 5 gallons in size). Simple economical methods and apparatus for utilizing such containers to prepare and dispense filtered water are disclosed herein. These provide an attractive alternative, in obtaining safe drinking water, to the purchase of bottled water or the installation of a tap water filtering device.

A method of filtering tap water may understood by reference to FIG. 1 which is an elevation view of a preferred filter embodiment 130, in accordance with the present invention, disposed between a dispensing container 120 filled with tap water 121 and a receiving container 122. In this arrangement the tap water is directed through filter media within the filter 130 and the filtered water 131 is discharged into the previously empty container 122.

To achieve the arrangement shown in FIG. 1, a user of the filter 130 first inserts the filter exit spout 134 into the empty beverage container 122. In a second step the beverage container 120 is filled with tap water, inverted and placed over the filter entrance spout 132.

The combination may then be left on a surface 136 until all of the tap water 121 has been filtered through the filter media and deposited as filtered water 131 in the container 122. Water spillage, during the inversion of the container 120, is contained by a buffer 140 (to be described hereinafter) which surrounds the entrance spout 132. In addition, during the filtering process, the buffer 140 accommodates a water pool that rises to a level 142 about the container 120 opening. Atmospheric pressure on the water surface 142 then automatically prevents water overflow.

Thus the filter 130 enables a simple economical method for filtering of tap water using containers 120, 122 that are in common everyday use. The filter media in the filter 130 may be any of various available types (e.g. granular activated carbon for removal of organic chemicals). Only a few moments are required to set up the combination shown in FIG. 1 and no further attention is required until the container 122 has been filled with filtered water. Several such containers could be filled in a short time and stored in a refrigerator providing filtered water for several days.

Figure 2:
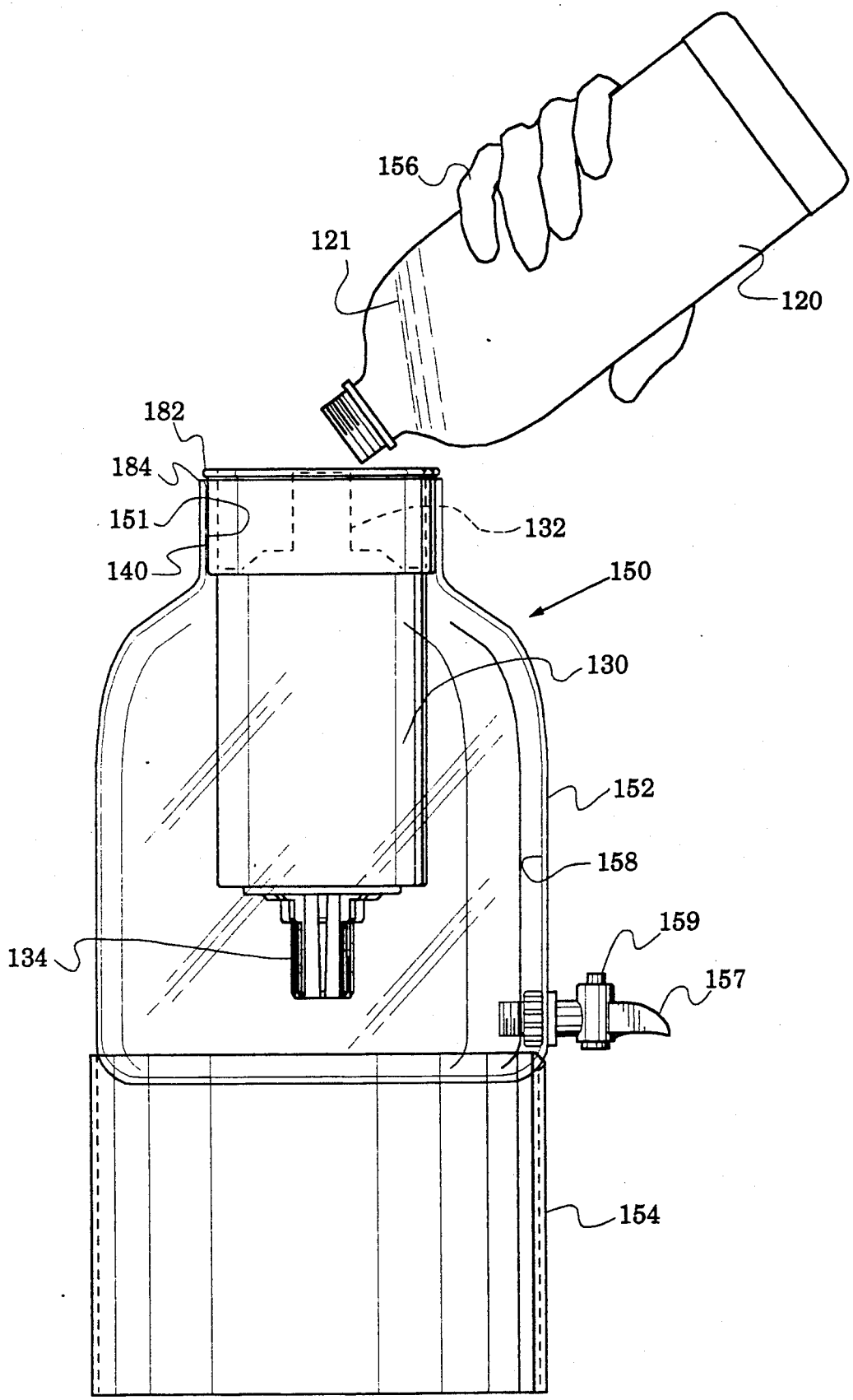
FIG. 2 is a side elevation view of a preferred water filter apparatus embodiment which includes the filter of FIG. 1, illustrating a one liter plastic beverage container being mounted on the filter entrance spout for discharging tap water thereinto.
Figures 3, 3A:
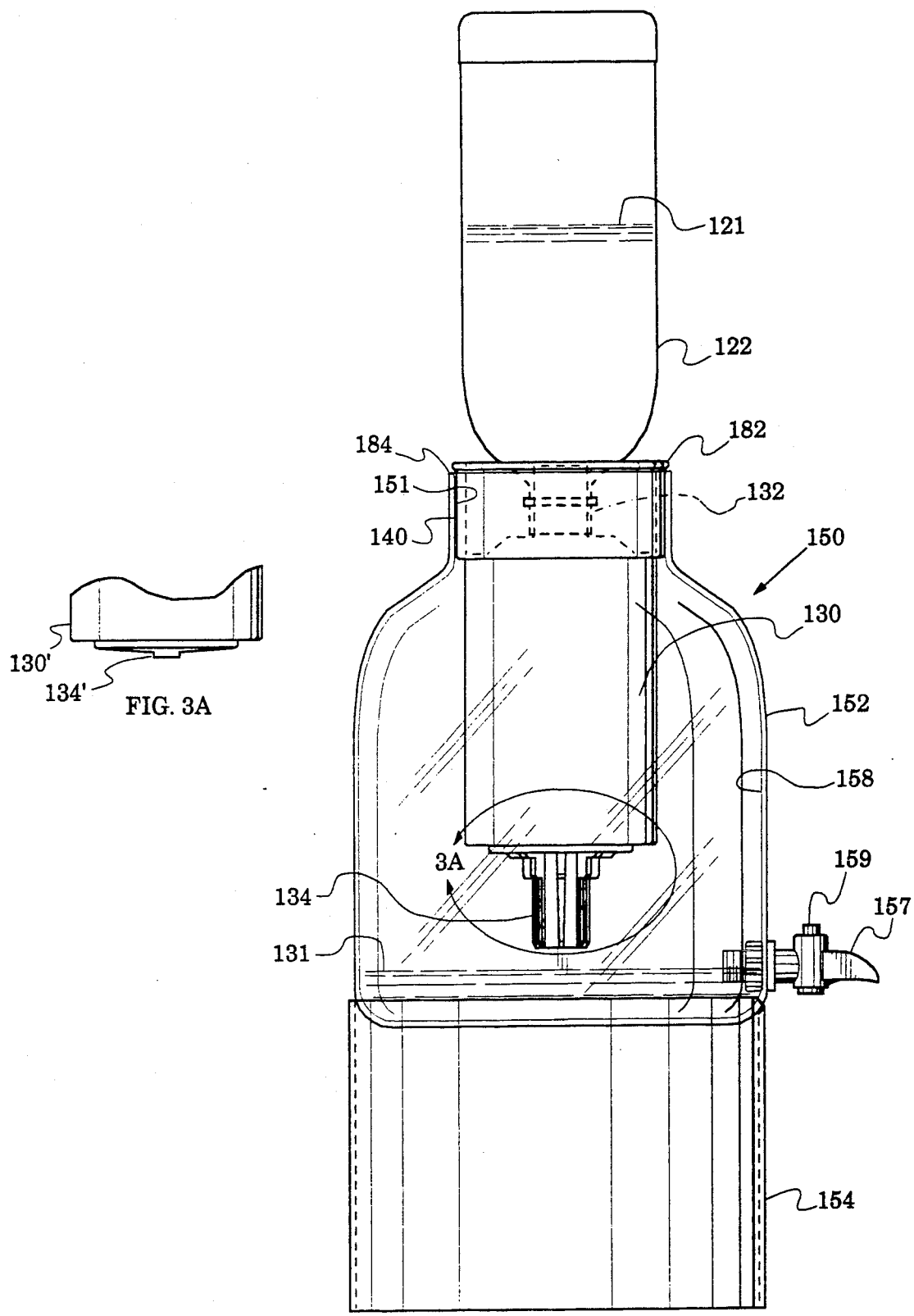
FIG. 3 is a view similar to FIG. 2 with the beverage container mounted on the filter entrance spout.
FIG. 3A is a view of the area enclosed by the line 3A of FIG. 3 illustrating another filter exit spout embodiment.

Another method for preparing and dispensing filtered tap water is shown in FIGS. 2 and 3 where the filter 130 forms part of a preferred filter apparatus embodiment 150. In the filter apparatus 150 the filter 130 is closely received in the opening 151 of a storage container or bottle 152 which rests in a stand 154. The dispensing container 120 is filled with tap water 121 and then inverted by a hand 156 of a user of the filter apparatus, as shown in FIG. 2, to the position on the filter entrance spout 132 shown in FIG. 3. As described above relative to FIG. 1, the buffer 140 prevents any water spillage during this maneuver.

In the position shown in FIG. 3 the tap water 121 is filtered through the filter 130 and discharged into the bottle 152 which thus serves as a storage container for filtered water. The dispensing container 120 may be refilled and the process repeated until the bottle 152 is filled. Filtered water 131 may then be dispensed as desired through a bottle faucet 157 mounted in the bottle wall 158. Thus a supply of filtered water is quickly and easily obtained with the economical use of tap water and common plastic beverage containers.

When the filter 130 is used with the filter apparatus 150 the extended exit spout 134 is not needed and a filter 130' having only an abbreviated exit spout 134' as shown in FIG. 3A (a view of the area within the line 3A of FIG. 3) may be used. The bottle 152 and stand 154 may be formed of suitable plastic compositions (e.g. polypropylene) and may be translucent or transparent as shown in FIGS. 2, 3 to display the filtered water level. The bottle faucet 157 is selectably operable by means of a button 159, is sealed to sealed to the bottle by O rings and is of a faucet type well known in the art.

Figure 4:
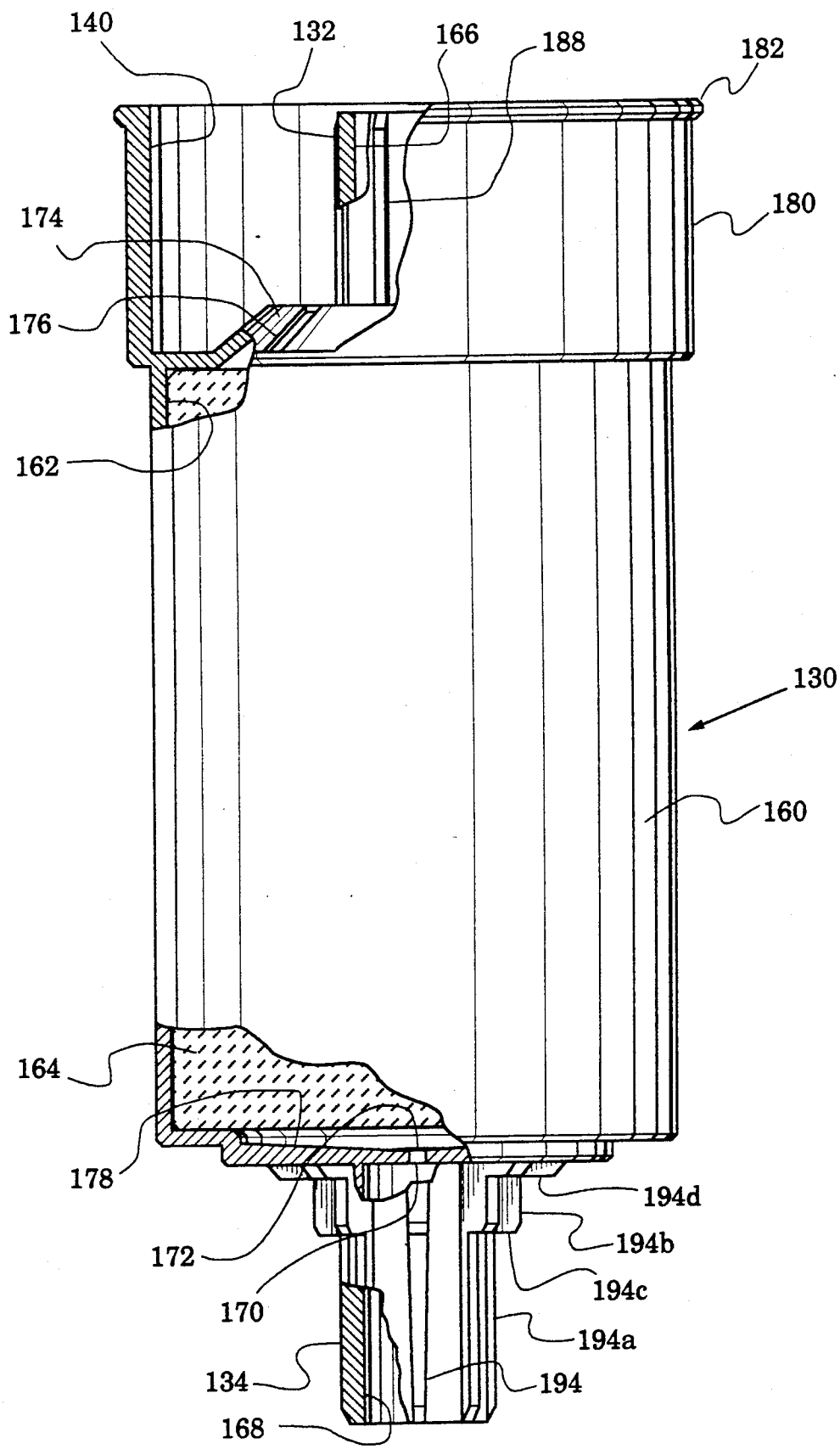
FIG. 4 is an elevation view of the filter of FIG. 1.
Figure 5:
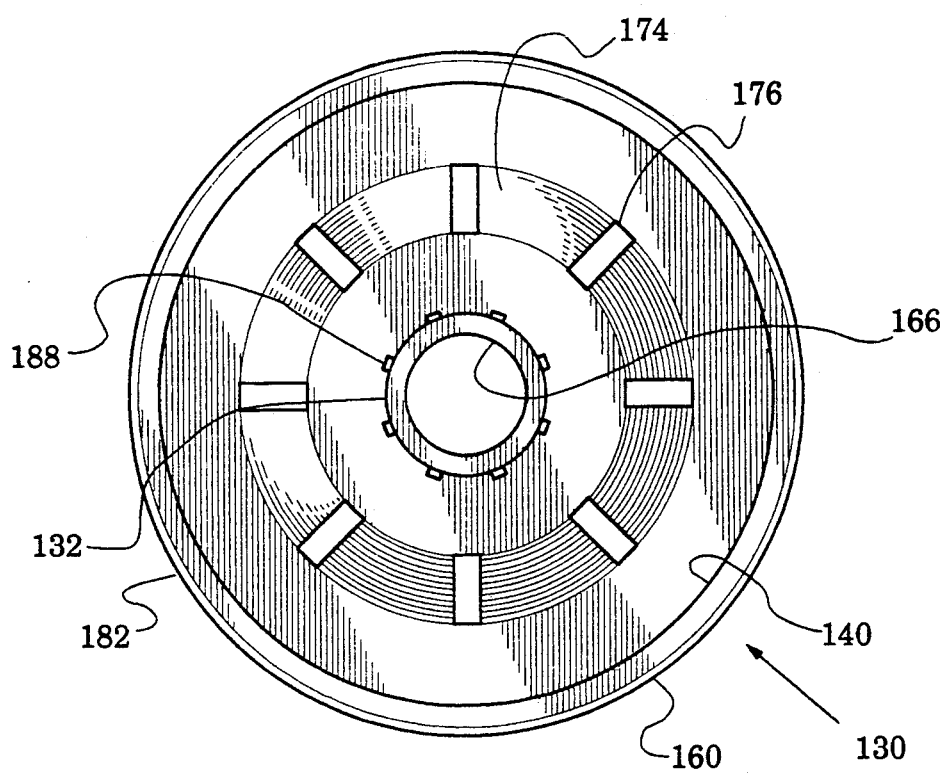
FIG. 5 is a top plan view of the filter of FIG. 4.
Figure 6:
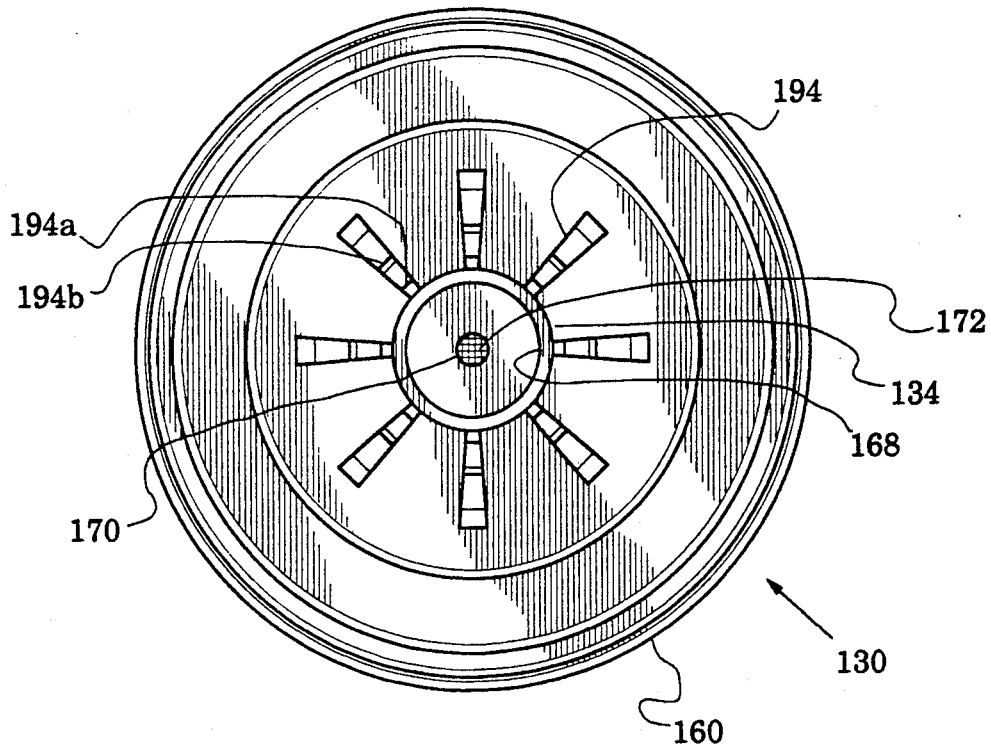
FIG. 6 is a bottom plan view of the filter of FIG. 4.

Details of the filter 130 are illustrated in the plan view of FIG. 4, the top elevation view of FIG. 5 and the bottom plan view of FIG. 6. The filter 130 comprises an elongated filter enclosure 160 defining axially projecting entrance and exit spouts 132, 134 and a cavity 162 therebetween which is filled with the filter media 164. The entrance spout defines an elongated aperture 166 which communicates with the cavity 162. Similarly the exit spout 134 defines an elongated aperture 168 terminating in a hole 170 which communicates with the cavity 162. The hole 170 is covered by a screen 172 to contain any loose filter media. The enclosure 160 further defines, at the base of the entrance spout 132, a floor 174 which has slots 176 which also communicate with the cavity 162.

The filter media 164 may be self supporting, contained within a permeable casing or loosely contained above a sloping floor 178 leading to the exit spout hole 170. Although it is contemplated that the entire filter 130 be discarded after a suitable period of use, it is also recognized that the enclosure 160 could be constructed with a removable portion (e.g. the entrance spout 132 and attached floor 174) for replacement of the media 164.

As previously mentioned with reference to FIG. 1 the filter enclosure defines a buffer 140 formed by a circumferential collar 180 radially spaced from the entrance spout 132 to define a toroidal volume thereabout. This toroidal volume or buffer functions to pool water to a level above the mouth of a beverage container placed on the spout 132 (as illustrated in FIG. 1) to prevent overflow. The buffer collar 180 terminates at its upper edge in a lip 182. The collar 180 is dimensioned to substantially equal the bottle opening (151 in FIGS. 2, 3) so as to be closely received therein. As shown in FIGS. 2 and 3 the bottle opening is surrounded by an annular rim 184. When the filter collar 180 is inserted into the bottle opening 151 the lip 182 abuts the rim 184 to retain the filter 160 in the opening 151.

The entrance spout 132 defines a plurality of radially extending ribs 188 which are dimensioned to contact the inner surface of the container mouth when the container 120 is placed over the entrance spout as shown, for instance, in FIG. 1. Thus the tap water 121 from the container 120 is directed through and about the spout 132 to enter the cavity 162 via, respectively, the aperture 166 and the slots 176.

The exit spout 134 similarly defines ribs 194 which enhance passage of air from the receiving container (e.g. container 122 in FIG. 1) as it is filled with filtered water. The ribs 194 have steps 194a, 194b which are configured to terminate at an imaginary annular surface dimensioned to fit various size beverage container openings (e.g. in the range of ¾ of an inch to one inch diameter to accommodate one liter beverage containers and in the range of one to one and ¼ inches diameter to accommodate one gallon beverage containers. As shown in FIG. 1, the one liter beverage container 122 is retained over steps 194a while larger containers may be retained over steps 194b. The ribs 194 also define stops 194c, 194d which abut the end of a container placed over the spout 134 (e.g. in FIG. 1 the stops 194c abut the container 122 mouth).

In similar manner the entrance spout ribs 188 extend radially to terminate at an imaginary annular surface which is preferably in the range of ¾ of an inch to one inch diameter to accommodate one liter containers. It should be understood that the entrance spout 132 may also have steps, similar to those on the exit spout, for abutting various sized containers.

The entrance spout 132 and exit spout 134 are both elongated to facilitate intimate contact with the beverage container necks over an extended distance from the container mouths. Thus lateral movement between the containers 120, 122 and the filter 130 is resisted by abutment between the spouts 132, 134 and the inner surface of the container necks. Accordingly, the container 122 is able to structurally support the filter 130 and the filter is able to structurally support the container 120.

Although the preferred entrance spout 132 is shown as extending into the mouth of container 120, it is recognized that in an alternative arrangement, the spout 132 could be dimensioned to receive the neck of container 120.

The exemplary filter embodiment 130 is configured with the following approximate overall dimensions; collar 180 diameter=3inches and length from lip 182 to end of exit spout 134=7 inches.

From the foregoing it should now be recognized that methods and apparatus therefor have been disclosed herein enabling a user thereof to prepare and dispense filtered tap water thus eliminating the need to purchase bottled water and/or install permanent or semipermanent filter devices. Apparatus in accordance with the invention can be manufactured economically from various plastics, used repeatably and easily stored when not in use.

The preferred apparatus embodiments depicted herein is exemplary and numerous modifications, dimensional variations and rearrangements can be readily envisioned to achieve an equivalent result, all of which are intended to be embraced within the scope of the appended claims.

What is claimed is:

1. Water filter apparatus, comprising:
    a storage container defining an internal volume and having an opening communicating therewith;
    a filter enclosure defining a filter media cavity and entrance and exit apertures communicating with said cavity;
    an entrance spout projecting from said enclosure, said entrance spout defining (1) an internal passageway communicating with said entrance aperture and (2) an external surface dimensioned to be received in a neck opening of a dispensing container so as to abut the internal surface of said neck opening for supporting the dispensing container in an inverted orientation;
    said filter enclosure removably mounted in said storage container opening with said entrance and exit apertures opening, respectively, externally and internally of said storage container internal volume; and
    a selectably operable faucet mounted in said container for dispensing water from said internal volume.

2. The filter apparatus of claim 1 wherein said filter defines about said entrance spout a peripheral buffer to pool water about said entrance spout for preventing water overflow therefrom.

3. The filter apparatus of claim 1 wherein said container defines a rim about said opening and said filter enclosure defines a lip to abut said rim for retaining said filter in said opening.

4. The filter apparatus of claim 1 further comprising a stand to receive said container for support thereof.

5. A method enabling a user thereof to conveniently prepare and dispense filtered tap water thus eliminating the need to purchase bottled water and/or install permanent or semipermanent filter devices, the method comprising the steps of:
    providing a hollow storage container having a dispensing faucet mounted in a wall thereof wherein said container defines an opening through said wall;
    inserting a filter having an entrance spout and an exit spout into said opening with said entrance spout disposed external to said storage container and said exit spout disposed to drain into said storage container;
    mounting a tap water dispensing container on said entrance spout for discharging tap water into said entrance spout for filtering through said filter into said storage container; and
    pooling said tap water about said entrance spout, to prevent overflow therefrom.

6. The method of claim 5 further comprising the step of dispensing filtered water from said faucet.

7. A method of filtering tap water comprising the steps of:
    filling a dispensing container with tap water through a neck opening in said container;
    mounting said dispensing container in an inverted orientation on the entrance spout of a filter apparatus having entrance and exit spouts with the internal surface of said dispensing container neck opening abutting the external surface of said entrance spout;
    mounting said filter apparatus on a storage container to discharge water from said exit spout into said storage container; and
    pooling water from said dispensing container about said entrance spout to prevent water overflowing from said filter apparatus.

* * * * *